Feb. 19, 1963 R. T. EICHMANN 3,078,043
APPARATUS FOR HEATING AND COOLING BUILDINGS
Filed Oct. 8, 1956 2 Sheets-Sheet 1

INVENTOR:
ROBERT THEOPHIL EICHMANN
By
Richardson, Davis and Verdon
ATTYS.

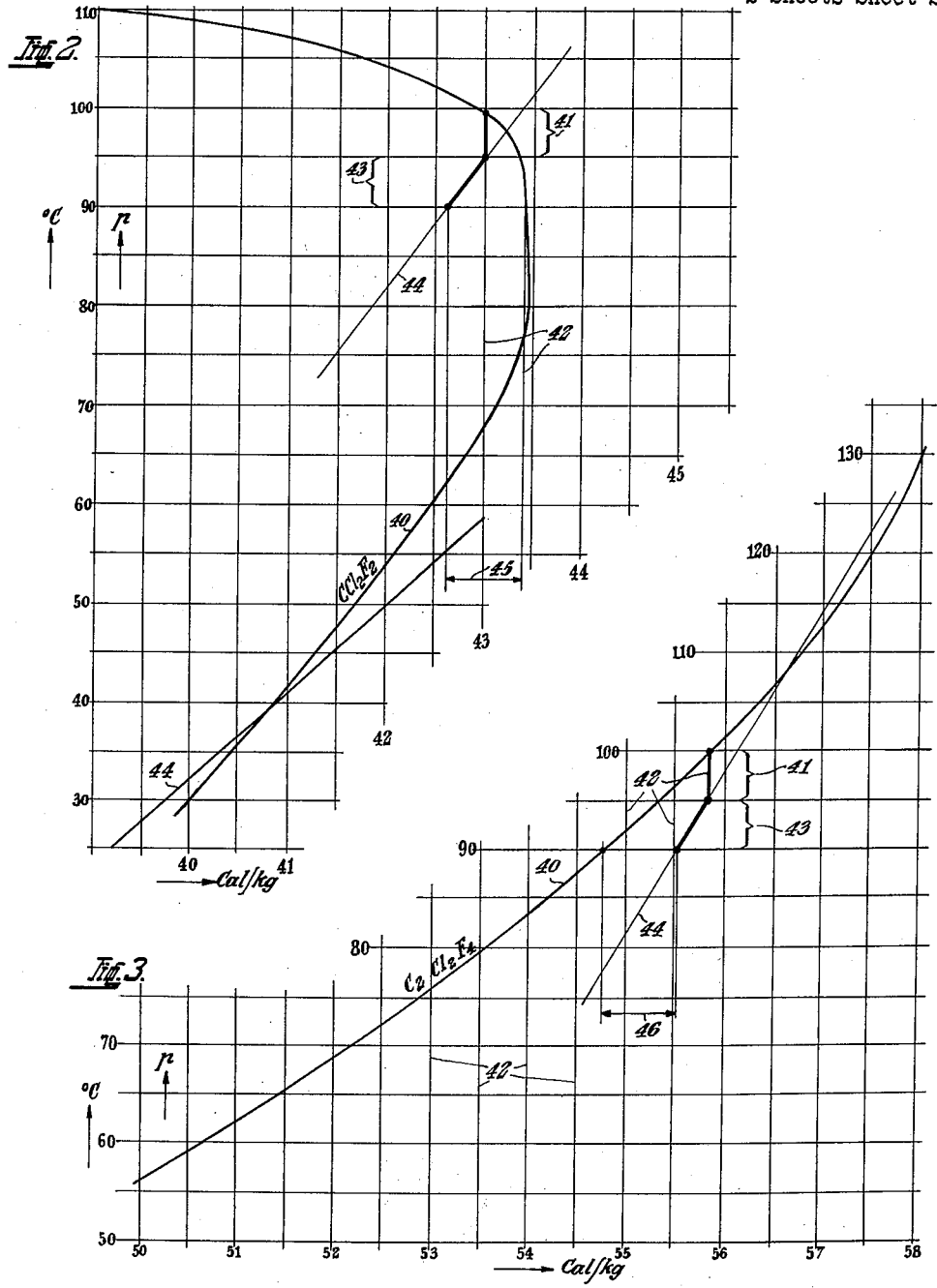

United States Patent Office 3,078,043
Patented Feb. 19, 1963

3,078,043
APPARATUS FOR HEATING AND
COOLING BUILDINGS
Robert Theophil Eichmann, Kollerweg 5,
Berne, Switzerland
Filed Oct. 8, 1956, Ser. No. 614,641
3 Claims. (Cl. 237—1)

The present invention relates to a central heating and cooling system for use in buildings or other enclosed structures, the system being so arranged that it may be used selectively for heating during cold weather or for moderate cooling during warm weather.

The present application is a continuation-in-part of my copending application, Serial No. 265,029 filed on January 4, 1952, now abandoned.

The heating and cooling system of the present invention comprises a central heat exchanger and a plurality of outlying radiator or convector units together with a closed circulatory distribution system of pipes or ducts which connects the outlying radiator and convector units to the central heat exchanger.

A feature of the system resides in the use of a non-corrosive and non-toxic fluid heat transfer medium which has a low freezing point. Additionally, the heat transfer medium has a temperature-enthalpy characteristic such that a superheating of its vapor is caused by the effects of pipe friction and by the pressure drop incidental to the reduction in hydrostatic pressure head as the heat transfer medium rises to the higher levels of the distribution system. This superheating of the vapor produces an important advantage in uniformity of heat distribution to the outlying radiators and convectors notwithstanding unavoidable heat losses in the piping of the distribution system.

The present system avoids the high minimum temperatures at the radiators which are necessarily involved in steam heating systems and also provides better and more uniform heat distribution throughout the system than is obtainable with hot water or water vapor heating systems. Additionally, because of the low freezing point of the fluid heat transfer medium, the system does not need to be drained before it is permitted to stand idle in cold weather.

When used for heating, the system of the present invention operates at temperatures in the range from 30° to 100° centigrade (86° to 212° Fahrenheit), depending upon the prevailing outdoor temperature and other factors affecting the heating demand imposed upon the system.

The heat distribution network of the present heating system utilizes extensive runs of thermally uninsulated pipes which have internal surfaces of normal roughness. Under ordinary operating conditions there may be a temperature difference of from 70° to 80° centigrade (158° to 176° Fahrenheit) between the pipes of the distribution network and the ambient temperature of the surrounding atmosphere. As a result, the heat losses in the distribution network may be considerable and may consume as much as 10% or more of the total heat input to the distribution network.

The use of a heat transfer medium which has a low freezing point together with a boiling point which is much lower than that of water is well known in the refrigeration art. The use of such a medium for heating purposes is also known. However, practically all of the conventional refrigerants are unsuitable for use in the operating range from 30° to 100° centigrade or therebeyond. This is because the vapors of such refrigerants, when used for heating in the 30° to 100° centigrade temperature range exhibit the undesirable property of becoming condensed in the risers and other parts of the distribution network. Such condensation is caused in part by pipe friction and in part by the reduced hydrostatic pressure at the higher levels of the distribution network. As a result, there is an inherent lack of uniformity of heat distribution which will seriously impair the operation of the heating plant.

It is an object of the invention to provide a heat transfer medium for circulation through the distribution network which avoids the undesirable condensation effects referred to above and which is additionally suitable for use directly in the outlying convectors for evaporation therein at any desired temperature in the range from 0° to 15° centigrade (32° to 59° Fahrenheit) during cooling operation of the system. The heat transfer medium then absorbs its heat of evaporation from the room air through the convectors. During cooling operation, a compressor draws off the vapor from the convectors and delivers it to the central heat exchanger which is then operated as a condenser. After condensation, the heat transfer medium is returned to the distribution network through a pressure reducing expansion valve for re-evaporation in the convectors.

When the system is used both for heating and cooling purposes, special convectors are provided which may supplement the usual radiators or conventional forced air circulation convectors. These special convectors are arranged in the upper portions of the walls of each room, just below the level of the ceiling. During heating operation, these convectors produce convection currents which circulate in a restricted zone below the ceiling level so that the ceiling becomes effectively uniformly heated independently of the rest of the room. As a result, heat is radiated downwardly from the warm ceiling and evenly distributed throughout the room. These same convectors produce downwardly flowing convection currents during cooling operation and the cooling convection currents travel in a generally uniform manner within the entire room. The room is thus heated by effectively uniform and evenly distributed downward radiation from the ceiling and cooled by convection currents which circulate with uniformity throughout the entire room.

An additional feature of these special convectors is that no blowers or other forced air circulation devices are required. Proper operation is assured both during heating and during cooling operation. The omission of blowers or the like offers obvious advantages both in initial cost and in operating and maintenance charges. Furthermore, objectionable drafts which are frequently produced by forced air circulation are avoided.

Another advantageous feature of the invention resides in use of a relatively small quantity of the heat transfer medium in the central heat exchanger and a high flow velocity for the vapor in the distribution network. This greatly increases the speed of thermal response of the system so that changes in the heat input to the central heat exchanger are rapidly transmitted to the outlying radiators and convectors. This reduction in thermal lag improves the fuel economy of the system when the system is in operation for heating purposes.

The invention will be more fully understood from the following description together with the accompanying drawing.

Referring to the drawing:

FIGURE 2 is a temperature-enthalpy diagram of a typical refrigerant or heat transfer medium illustrating thermodynamic characteristics which render such refrigerant unsuitable for use in the system of the present invention.

FIGURE 3 is a temperature-enthalpy diagram illustrating the thermodynamic characteristics of the fluid heat transfer medium used in the system of the present invention.

Figure 1:
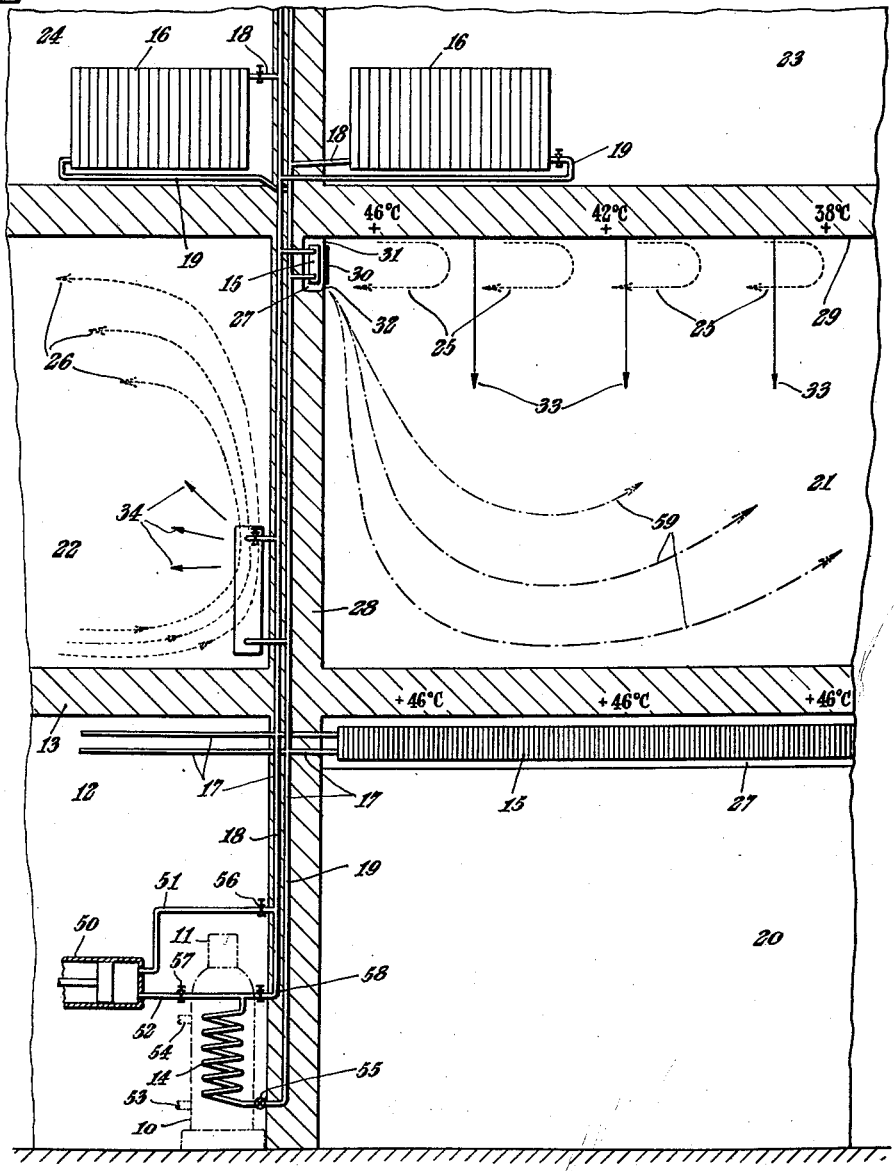
FIGURE 1 is a diagrammatic view of a heating system embodying the invention, the system being included in a building which is shown in sectional elevation.

In FIG. 1 there is shown a heating system which comprises a central heat exchanger 10 which includes a boiler or tank. An oil burner 11 is shown mounted on the heat exchanger 10 for use when the system is in operation for heating purposes. Alternatively, any other suitable source of heat may be used instead of the oil burner 11, if desired. The heat exchanger 10 is shown located in the basement of a building 13.

The tank of the heat exchanger 10 contains a suitable liquid of low freezing point (below −40° C., −40° F.) in which there is immersed a heat exchange coil 14. The coil 14 is connected to a distribution network 17 comprising risers and return flow pipes which extend to special convectors 15 and to conventional radiator units 16. The distribution network 17 is hermetically closed and is effectively free from air and moisture. That portion of the system which comprises the heat transfer coil 14, the convectors 15, radiators 16 and distribution network 17 is filled with a fluid which can be evaporated in the heat exchanger 10 for transferring heat therefrom at any desired temperature in the range from 30° C. to 100° C. or higher. The heated vapor is transmitted over supply pipes 18 of the network 17 to the outlying convectors 15 and radiators 16 where the vapor delivers its heat to the several rooms of the building and becomes condensed. The condensate flows back to the coil 14 by gravity through return pipes 19 of the network 17.

The convector units 15 are positioned near the ceilings of the rooms 20 and 21 to produce convection currents near the ceiling as indicated by the arrow-headed dash lines 25 in room 21. The radiator units 16 are positioned in the rooms 22, 23 and 24 to produce the usual convection currents indicated by the arrow-headed dash lines 26 in room 22.

Referring to room 21, the convector 15 is disposed in a recess 27 located in a wall 28 of the room just below the ceiling 29. The recess 27 opens toward the center of the room and is closed at its top, bottom and rear sides. The open side of the recess 27 is partially closed by a board or plate 30 which is disposed in alignment with the surface of the wall 28 and effectively conceals the convector 15 from view. The upper and lower edges of the board 30 define upper and lower slots 31 and 32, respectively, for the circulation of convection currents. The convector 15 and board 30 may extend throughout the entire length of the wall 28 so that they are coextensive with the upper portion of the wall 28 in which the recess 27 is formed. The upper slot 31 is adjacent to the ceiling 29 and the lower slot 32 is spaced about 10 inches below the ceiling 29.

The natural air convection 25 caused by the heated convector 15 takes place in a zone of restricted height just below the ceiling 29 so that the ceiling 29 becomes heated, for instance to temperatures between +46° and +38° C., such temperatures approaching the lower limit with increasing horizontal distance from the convector. The heated ceiling then radiates heat uniformly from its surface downwardly into the entire room, as indicated by arrows 33. The natural air convection 26 and radiation 34 caused by the radiators 16 is well known and requires no explanation.

For obtaining efficient heating operation by means of the described ceiling radiation, the temperature must be as uniform as possible over the entire area of ceiling 29 and, therefore, the convector 15 must have a uniform temperature throughout its length (see room 20). The heating of such an elongated convector by means of hot water, however, would give a temperature difference of about 15° or 20° C. between the two ends of the convector. This disadvantage is avoided with the heating system according to the invention, because the vapor of the heat transfer medium is condensed throughout the entire length of the convector at constant temperature, the convector having thus the same temperature from end to end.

The heat transfer medium must comply with the following requirements in order to be suitable for use in the heating system of the present invention:

(1) Frost-resistance, such as freezing point lower than 40° C.;

(2) Chemical stability at any temperature up to +120° C.;

(3) A boiling point not below 0° C.; and (4) The saturated vapor, when flowing through an extensive and uninsulated distribution network of pipe lines, shall not liquefy within the operating temperature range of the system up to at least +100° C. In this respect is it very important to mention the following facts.

(a) a partial liquefaction of saturated vapor is caused by the usual heat loss along the uninsulated vapor pipe lines. In both of the enthalpy diagrams shown in FIGS. 2 and 3 the wet vapor area is on the left side of the saturation curve 40 of the vapor.

(b) A drop in pressure is caused by the flow friction of the vapor in the relatively extensive vapor distribution lines of the system. This drop 41 in pressure $p$ is a mere throttling process and occurs therefore without any change of the enthalpy $i$ of the vapor, that means along a vertical line or ordinate of constant enthalpy 42 in the temperature-enthalpy diagrams (FIGS. 2 and 3).

(c) A drop in pressure caused by the potential pressure head on account of the height to which the vapor must rise from the heat exchanger 10 to the outlying units 15 and 16. This drop 43 in pressure $p$ occurs without change of the entropy of the vapor, that means along an inclined line of constant entropy 44 in the temperature-enthalpy diagrams (FIGS. 2 and 3).

The conventional vaporizable liquids generally considered as refrigerants, for instance $CH_4$, $C_2H_6$, $C_3H_8$, $C_4H_{10}$, $C_4H_{10}O$, $CCl_4$, $CH_2Cl$, $CH_3Cl$, $C_2H_5Cl$, $CHClF$, $CHClF_2$, $CCl_2F_2$, $CClF_2$ $CClF_3$, $CCl_3F$, $C_2Cl_3F_3$, $CO_2$, $N_2O$, $SO_2$ and $NH_3$, exhibit thermodynamic characteristics such as shown in the temperature-enthalpy diagram (FIG. 2) or a similar entropy diagram, at least within a considerable section of the operating temperature range of the system such that the lines of constant enthalpy 42 and the line of constant entropy 44 extend for a decreasing value of pressure $p$ into the area of wet vapor (on the left of the saturation curve 40 in FIG. 2). Due to this fact, the vapor of such refrigerants will partially liquefy to a considerable degree as indicated by the horizontal distance 45 while flowing through risers and extensive and widely ramified vapor pipe lines and the usual heat loss along such uninsulated pipe lines will increase this liquefaction so that the uniformity of heat distribution in a system wherein such a liquid is used as a heat transfer medium will be seriously impaired and the system may even be inoperative in certain sections of the desired operating temperature range of the system.

However, the saturated vapor of the heat transfer medium which is utilized according to the present invention has the thermodynamic property of superheating itself during the change of state 41 in FIG. 3 due to pipe friction (along a line of constant enthalpy 42) and also during the change of state 43 due to the static pressure head caused by the height of the vapor column (along a line of constant entropy 44). The amount of superheating represented by the horizontal distance 46 is thereby adapted to compensate effectively for the usual heat loss of the vapor pipe line. This result is based on the fact that the lines of constant enthalpy 42 and the lines of constant entropy 44 extend for decreasing values of pressure $p$ into the area of superheated vapor (on the right of the saturation curve 40 in FIG. 3.)

Among all hitherto existing volatile liquids there have been found only two liquids which meet the above mentioned requirements, first of all in that throughout the entire operating temperature range of the system the saturated vapor becomes superheated in the event of any change of state by a drop in pressure either with constant enthalpy or with constant entropy. These two volatile liquids are dichlorotetrafluoroethane ($C_2Cl_2F_4$) and bromochlorodifluoromethane ($CBrClF_2$). The freezing points of these two liquids are below —40° C. (—40° F.).

In order to arrange the system to provide for a moderate cooling of the rooms 20 and 21, it further comprises a compressor 50, the suction side of which is connected through an intake pipe 51 18 and the pressure side of which is connected through an exhaust pipe 52 to the heat exchange coil 14 and therethrough to pipe 19. The coil 14 now operates as a condenser. For this purpose, an inlet connection 53 and an outlet connection 54 are provided for the circulation of a coolant. Between the coil 14 and the pipe 19 there is provided a controllable pressure reducing valve 55. The intake and exhaust pipes 51 and 52 are each equipped with a shut-off valve 56 and 57, respectively. A further shut-off valve 58 is arranged between the upper end of the coil 14 and the pipe 18.

During cooling operation of the system, the shut-off valves 56 and 57 are open, while the valve 58 is closed. The heat transfer medium is cooled and condensed in the coil 14 and flows through the pressure reducing valve 55 which may be thermostatically controlled in known manner, into pipe 19 and therethrough into the special convectors 15 in the rooms 20 and 21. These convectors now operate as evaporators withdrawing heat from the room air for evaporating the volatile heat transfer medium supplied to the convectors. The resulting vapor is withdrawn through pipes 18 and 51 by means of the intake of the compressor 50 and is fed under pressure from the outlet side of compressor 50 to the heat exchange coil 14. This cooling action of the convectors 15 will cause a natural circulation of air convection currents extending over the entire height of the room to be cooled and indicated in room 21 by arrow-headed dot-dash lines 59. From this it may be seen that power operated blowers or similar ventilator means can be omitted during cooling operation of the system as well as during heating operation by the use of convectors located near the ceiling, as shown. During cooling operation, the temperature of the heat transfer medium is maintained at about 15° C. in the convectors 15 and at about 30° C. in the condenser coil 14 at a pressure of 2.2 to 1.5 atmospheres absolute.

I have shown and described what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. In a central heating system which comprises a central heat exchanger, a plurality of remotely positioned radiator and convector units, a distribution network of pipes connecting said heat exchanger to said units and a collecting network of pipes connecting said units to said heat exchanger, said networks, units and heat exchanger forming together a vapor-tight hermetically closed circulation system effectively free from air and moisture, the improvement which comprises a volatile fluid heat transport medium in said closed system, said medium being selected from the group consisting of dichlorotetrafluoroethane ($C_2Cl_2F_4$) and bromochlorodifluoromethane ($CBrClF_2$).

2. The improvement according to claim 1, in which said medium is dichlorotetrafluoroethane ($C_2Cl_2F_4$).

3. The improvement according to claim 1, in which said medium is bromochlorodifluoromethane ($CBrClF_2$).

References Cited in the file of this patent

UNITED STATES PATENTS

| | | |
|---|---|---|
| 1,993,288 | Smith et al. | Mar. 5, 1935 |
| 2,260,887 | Dasher | Oct. 28, 1941 |
| 2,456,492 | Dixon | Dec. 14, 1948 |
| 2,496,143 | Backstrom | Jan. 31, 1950 |
| 2,619,326 | McLenegan | Nov. 25, 1952 |
| 2,756,970 | Herman | July 31, 1956 |

FOREIGN PATENTS

| | | |
|---|---|---|
| 519,661 | Belgium | May 30, 1953 |
| 519,677 | Belgium | May 30, 1953 |
| 1,111,363 | France | Feb. 27, 1956 |

OTHER REFERENCES

Chemical Engineers Handbook—by John Perry, McGraw Hill Book Co., New York City, N.Y. 1941, page 2550, Table 12a.